April 24, 1928.  J. P. CROWLEY  1,667,141
VALVE
Filed June 22, 1925
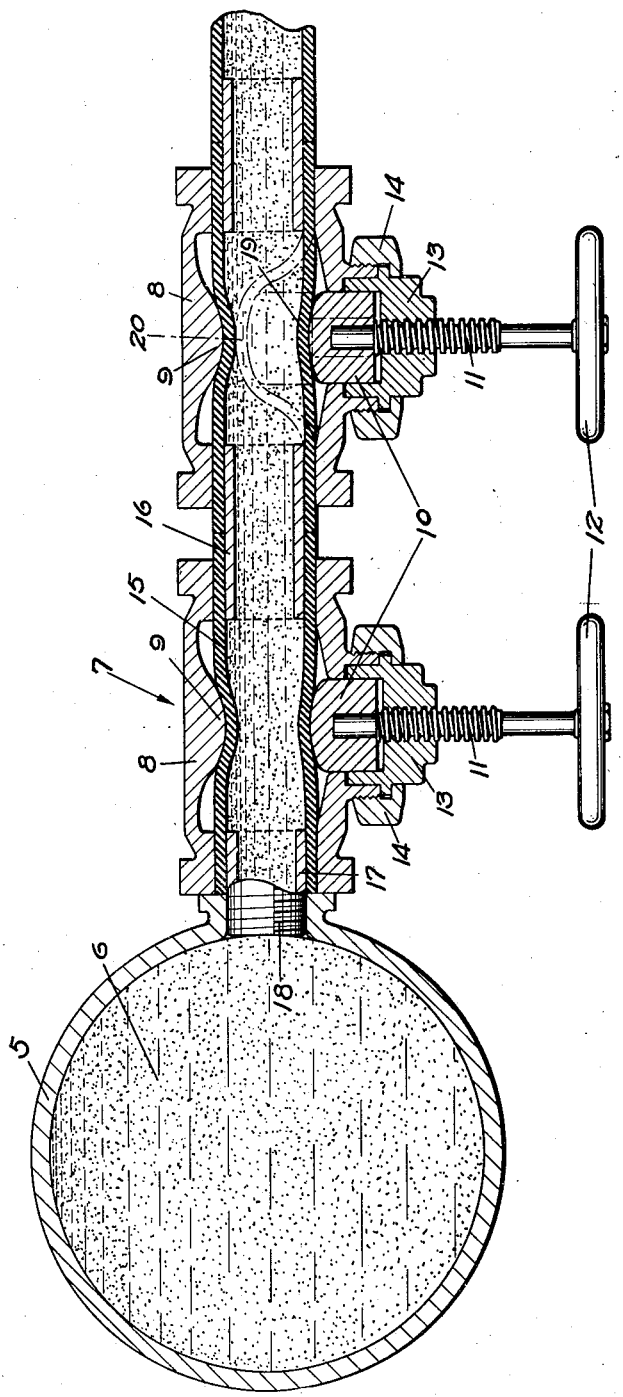
INVENTOR.
Joseph P. Crowley.
Frank Fraser.
ATTORNEY.

Patented Apr. 24, 1928.

1,667,141

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

VALVE.

Application filed June 22, 1925. Serial No. 38,637.

The present invention relates to a valve, and has particular reference to a valve adapted to withstand the wear of an abrasive passing therethrough.

An important object of the invention is to provide a valve comprising a housing having a plurality of ports therein, said valve having a compressible tubular member extending through the housing, which is adapted to be compressed to control the effective opening thereof.

Another object of the invention is to provide a valve having a compressible member therein which can readily be removed and replaced when it has become worn.

Other objects and advantages of the invention will become apparent during the course of the following description.

The drawing is a longitudinal section through the valves in operation.

This invention is particularly well-adapted for use in an abrasive system wherein an abrasive held in suspension in water is continuously circulated through a piping system controlled by valves. An ordinary valve is not suitable in this system as the abrasive action is detrimental to the valve parts so that the life of the valve is very short necessitating frequent repairs and replacements.

The numeral 5 designates one pipe of a system adapted to contain a flow of abrasive 6. The valve is designated in its entirety by the numeral 7, and comprises a housing 8 having a plurality of ports. The valve is provided with a seat 9 and a plunger 10. The plunger 10 is carried by the valve stem 11 rotatable by means of the wheel 12. The stem 11 is screw-threadedly operable through the cap 13 carried by the valve and held in position by means of the union 14. Extending through the valve between the seat 9 and the plunger 10 is a rubber hose 15. The hose 15 may be constructed of any suitable fabric and is not necessarily restricted to rubber, although rubber hose has been found to be entirely satisfactory. The hose is clamped in the ports by means of the bushings 16 and 17. The bushing 17 is provided with the threads 18 whereby connection may be had with the pipe 15. The right-hand valve of the drawings shows in heavy lines the hose as at 19 in open position, and in dotted lines as at 20 in a compressed position whereby the flow of abrasive is completely shut off. Any intermediate adjustments can easily be made. The hose is flexible so that it can be compressed as indicated in the drawings when the valve stem 11 has been operated by means of the wheel 12 without injury.

If it is desired a pair or more of valves may be arranged in series so that one valve can be adjusted to give the desired flow through the pipes, while the other valve can be used merely to entirely close or entirely open the hose connection to the pipe 5.

When the hose has become worn it can be removed from within the housing and a new length can be placed in position.

It is to be understood that the form of the invention herewith shown and described is to be taken as the preferred embodiment of the same, and that various changes in the shape, size and arrangement of parts may be restorted to without departing from the spirit of the invention or the scope of the subjoined claims.

Claims:
1. A valve of the character described comprising a housing, a compressible member running through said housing, means for compressing said member, and bushings arranged within the housing at opposite ends thereof for securing said member in place, one of said bushings extending beyond the housing and adapted to be engaged with a suitable support for retaining said valve in desired position.

2. The combination with a conduit having an opening therein, of a valve including a housing, a compressible member running through said housing, means for compressing said member, and bushings within said member for securing the same in place, one of said bushings extending beyond the housing and received within the opening in the conduit whereby to secure the valve thereto.

3. The combination with a conduit having a lateral opening therein, of a plurality of valves including housings arranged end to end and spaced from one another, a compressible member running through said housings, means associated with each housing for compressing said compressible member, and bushings arranged within said housings for securing the valves together and the compressible member in position, one of said bushings extending beyond one of said housings and received within the opening in the conduit whereby to secure the valves thereto.

Signed at Toledo, in the county of Lucas, and State of Ohio, this 18th day of June, 1925.

JOSEPH P. CROWLEY.